Patented May 25, 1937

2,081,155

UNITED STATES PATENT OFFICE 2,081,155

ARTIFICIAL FILM CONTAINING DERIVATIVES OF CELLULOSE

George Schneider, Montclair, N. J., assignor to Celanese Corporation of America, a corporation of Delaware No Drawing. Application July 17, 1934,
Serial No. 735,627

4 Claims. (Cl. 106—40)

This invention relates to films and filaments of high tensile strength, which are tough, and relatively impermeable to moisture and filaments containing organic esters of cellulose that have a more compact structure than that of like articles produced normally.

An object of the invention is the economic and expeditious production of filaments and films that have a compact structure, are relatively impermeable to moisture, and are of high tensile strength and toughness. Other objects of the invention will appear from the following detailed description.

I have found that in forming filaments, films, foils, etc., of materials such as the derivatives of cellulose, a small fraction of a low viscosity derivative added to a larger fraction of higher viscosity derivative produces products of superior properties including increased moisture-proofness and greater elasticity. For instance, by mixing together two cellulose acetates of substantially similar acetyl value but of differing viscosity, films, sheets, foil, filaments, etc. of superior properties may be formed therefrom.

Films and filaments formed according to this invention are more elastic and pliable and less permeable to water. This is shown by films which, when formed according to this invention using a mixture of cellulose acetates of different viscosity, have a fold number of 46 as compared with 30 for films of the same size and thickness formed from normal cellulose acetate. The plasticizer loss in water, after drying, is less than that of similar size films of the two fractions of which the film is composed, thus indicating lower permeability.

According to my invention, I form films and filaments from a solution of plastic material, the base material of which comprises a mixture that may be formed by intimately mixing together two fractions of a single material, one fraction having a low viscosity and the other fraction having a higher viscosity, such that, when they are formed into a film, filament or foil, there is an internal arrangement of the components of the fractions. The film, filament or foil obtained from such solutions are more compact and slightly stiffer than normal stock but less brittle, less permeable to liquids and moisture and more pliable. There is an increase in flexibility and also elongation obtained over normally prepared stock.

This invention is applicable to all types of plastics that are used to form films or filaments and especially to plastics the base material of which is an organic derivative of cellulose such as the organic esters of cellulose and cellulose ethers. Examples of organic esters of cellulose are cellulose acetate, cellulose formate, cellulose propionate and cellulose butyrate, while examples of cellulose ethers are methyl cellulose, ethyl cellulose and benzyl cellulose.

While this invention is applicable to many types of film and filament forming materials, it will be described in detail with reference to cellulose acetate. The other base materials may be processed in accordance with this invention in an obvious way with analogy to the description relating to cellulose acetate.

In the manufacture of cellulose derivatives, products of varying viscosities can be obtained according to the method of manufacture. In general, the tendency in commercial practice has been to attain as high a viscosity as possible consistent with the application to which the solution of cellulose derivative is to be put. The viscosities of cellulose esters or ethers, employed for artificial filaments, films, ribbons and the like, are very much higher than the viscosity of the cellulose derivative employed in lacquer manufacture. The reason for employing a derivative of cellulose of as high a viscosity as possible is that the strength of the resultant filament, film, ribbon and the like is proportional and dependent upon the degree of preservation of the cellulose molecule in the process of manufacture. The less the degree of degradation of the cellulose, the higher the strength of the resulting product. However, I have now found that even stronger products may be formed by adding a fraction of low viscosity cellulose derivative to the high viscosity cellulosic derivative normally employed.

Films and filaments that are relatively impermeable to moisture as well as pliable and tough may be formed from a mixture comprising cellulose derivatives of relatively high viscosity characteristics, such as are commonly employed in the manufacture of such articles, and substantial proportions of the cellulose derivatives of much lower viscosity characteristics. Thus, for instance, in the case of cellulose acetate, considerable advantages accrue from mixing a cellulose acetate of a viscosity of 15 to 25 or 30 or more (measured in a 6% acetone solution against glycerine as 100) with a substantial proportion, say, between 5 and 20% of a cellulose acetate having a much lower viscosity characteristic, say, a viscosity characteristic below 10 and particularly about 5.

This invention comprises broadly the manufacture of filaments, yarns, ribbons, films, foils, lacquers, dopes, plastics and other articles, particularly from cellulose derivatives or other base materials having substantial proportions of at least two constituents of the same chemical nature but which differ widely in viscosities. The invention also includes the solutions or other compositions themselves from which products may be made.

It is possible to produce derivatives of cellulose containing products of different viscosities in a single treatment, and, in fact, all commercial derivatives of cellulose contain constituents which differ slightly from each other. The order of difference, however, is not sufficient for the purposes of the present invention, and it is necessary either to take special measures during the production of the derivative of cellulose to produce a product having the requisite degree of heterogeneity, or to obtain the derivatives of cellulose of the required differences in viscosity in separate operations and subsequently to mix them before making the products therefrom. For commercial manufacture it is far move convenient to adopt the latter method.

Any suitable method may be adopted to obtain the derivatives of cellulose having different viscosity characteristics. Thus, for instance, to cellulose acetate normally employed for producing filaments, there may be added cellulose acetate normally employed for producing lacquers in order to form a mixture of two cellulose acetates having widely differing molecular size.

In the manufacture of organic esters of cellulose, the cellulose, with or without a pretreatment, as, for instance, with organic acids and/or mineral acids, is subjected to esterification usually with the aid of an anhydride in the presence of a mineral acid catalyst, and the resulting cellulose ester, is subsequently ripened to obtain the required solubility characteristics. Any or all of these stages may be modified in order to produce the products of widely differing viscosity characteristics yet having similar acyl values required for the purpose of the present invention. Thus, the relatively high viscosity ester of cellulose may be produced, in a manner customary to the manufacture of filaments and yarns, by esterifying a cellulose pretreated with acetic or formic acid at relatively low temperatures; while the relatively low viscosity ester of cellulose may be produced by conducting the esterification at higher temperatures.

Any solvent, mixture of solvents or solvent mixture for the purpose in view, i. e. for the manufacture of filaments, films or lacquers and so forth, which will dissolve the mixture of the derivatives of cellulose to the requisite extent may be employed. The particular solvent employed will depend upon the particular characteristics of the derivatives of cellulose employed to form the mixture. Examples of solvents that may be employed are anhydrous acetone, acetone and water, acetone and methyl or ethyl alcohol, ethylene dichloride, ethylene dichloride and ethyl or methyl alcohol, and similar solvents.

The invention is of the greatest importance in relation to the manufacture of artificial filaments, yarns, ribbons, films and foils, since high tensile strength, pliability and impermeability to water is of the greatest importance in these products. However, as already indicated, the invention may be used with advantage in the manufacture of lacquers and plastics. Such lacquers and plastic compositions may contain any desired effect materials for the purpose of modifying the properties of the resulting product, as, for example, medium or high boiling solvents or plasticizers, white or colored pigments, resins or the like. Similarly, in the case of spinning solutions or film casting solutions, pigments of the requisite state of subdivision may be incorporated in the solutions for the purpose of producing products having reduced luster.

The spinning solutions and the film forming compositions of the present invention may be worked up to produce the desired filaments, yarns, ribbons, films, etc. by wet or dry processes of spinning and casting normally employed in the art.

The following examples are given to illustrate the invention but it is to be understood that they do not limit the invention in any way.

*Example I*

There are mixed 85 parts of cellulose acetate having a viscosity 26 to 30 with 15 parts of cellulose acetate having a viscosity of 4 to 7. Both cellulose acetates have practically the same acetyl value of 52 to 55%. One part of the mixture is dissolved in three parts by weight of acetone-water solvent and the solution is spun into filaments by either a wet or dry method of spinning. The filaments produced are less permeable to liquids than filaments formed of either fraction and both the wet and dry tensile strength is increased over that of either fraction spun separately.

*Example II*

The same mixture of cellulose acetates as prepared in Example I is dissolved one part in 4 parts of acetone-water solvent and then 35%, on the weight of the cellulose acetate, of dibutyl tartrate is added. The resulting solution is cast on a film wheel or flowed into a sheet. The solvent is allowed to evaporate and the resultant films or foils are seasoned for 18 hours at 50° C.

The resulting films are tough and pliable with a higher tensile strength than either of the fractions when formed into similar films. The films are much improved in their impermeability to liquids and are substantially moisture proof without further treatment.

The addition of quantities of low viscosity cellulose acetate to high viscosity cellulose acetate has a strengthening effect on a film flowed from such a mixture when these additions consist of amounts in the neighborhood of 5 to 20% of the cellulose acetate of lower viscosity characteristics. Tensile strength and elongation determinations at both the yield point and the breaking point indicate that the addition of 10 or 15% low viscosity cellulose acetate to high viscosity cellulose acetate increases the tensile strength as much as 10 or 12%. The determinations further indicate that the strength rises rapidly to a maximum and falls away abruptly.

It is to be understood that the foregoing detailed description is merely given by way of illustration and many alterations may be made therein without departing from the spirit of my invention.

Having described my invention what I desire to secure by Letters Patent is:

1. Self-supporting films or foils of high moisture impermeability and improved flexibility, comprising two intermixed varieties of an organic derivative of cellulose which are substantially identical in chemical composition, but which have viscosity values of approximately 15 to 30 units and less than 10 units as defined, respectively, the lower viscosity cellulose derivative being present in an amount approximately 5 to 20% of that of the higher viscosity variety.

2. Self-supporting films or foils of high moisture impermeability and improved permeability, comprising two intermixed varieties of an organic derivative of cellulose which are substantially identical in chemical composition, but which have viscosity values of approximately 15 to 30 units and less than 10 units as defined, respectively, and a plasticizer for the organic derivative of cellulose, the lower viscosity cellulose derivative being present in an amount approximately 5 to 20% of that of the higher viscosity variety.

3. Self-supporting films or foils of high moisture impermeability and improved flexibility, comprising two intermixed varieties of cellulose acetate which are substantially identical in chemical composition, but which have viscosity values of approximately 15 to 30 units and less than 10 units as defined, respectively, the lower viscosity cellulose acetate being present in an amount equal to 5 to 20% of that of the higher viscosity cellulose acetate.

4. Self-supporting films or foils of high moisture impermeability and improved flexibility, comprising two intermixed varieties of cellulose acetate which are substantially identical in chemical composition, but which have viscosity values of 26 to 30 units and 4 to 7 units as defined, respectively, the variety of lower viscosity being present in an amount 5 to 20% of that of the variety of higher viscosity.

GEORGE SCHNEIDER.